United States Patent
Murayama et al.

(10) Patent No.: US 8,016,094 B2
(45) Date of Patent: Sep. 13, 2011

(54) CENTRIFUGAL CLUTCH AND STRADDLE TYPE VEHICLE INCLUDING THE CENTRIFUGAL CLUTCH

(75) Inventors: Takuji Murayama, Shizuoka (JP); Kazunori Ooi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 691 days.

(21) Appl. No.: 12/128,480

(22) Filed: May 28, 2008

(65) Prior Publication Data

US 2008/0296076 A1 Dec. 4, 2008

(30) Foreign Application Priority Data

May 30, 2007 (JP) .................................. 2007-143218

(51) Int. Cl.
 *F16D 43/08* (2006.01)
(52) U.S. Cl. ................. 192/70.23; 192/105 B
(58) Field of Classification Search ............... 192/70.23, 192/105 B, 52.1
See application file for complete search history.

(56) References Cited

U.S. PATENT DOCUMENTS

| 834,499 | A | * | 10/1906 | Sturtevant et al. | 192/105 B |
| 2,496,201 | A | * | 1/1950 | Dodge | 192/105 B |
| 3,006,449 | A | * | 10/1961 | Binder | 192/105 B |
| 2006/0090944 | A1 | * | 5/2006 | Ishida et al. | 180/219 |

FOREIGN PATENT DOCUMENTS

JP 2007-038736 2/2007

* cited by examiner

*Primary Examiner* — Rodney Bonck
(74) *Attorney, Agent, or Firm* — Keating & Bennett, LLP (57) ABSTRACT

To centrifugal clutch with reduced size, which facilitates reduced width of a straddle type vehicle, includes a clutch housing on which an outer plate is mounted, and a clutch boss on which an inner plate is mounted. A roller weight is provided between the clutch housing and a rightmost outer plate. A cam surface formed on the clutch housing guides the roller weight in a direction such that the outer plate and the inner plate are press-fitted together when the roller weight moves outward in a radial direction of a secondary sheave shaft. A cam surface formed on the rightmost outer plate guides the roller weight outward in the radial direction and toward the cam surface with respect to an axial direction when the roller weight moves outward in the radial direction of the secondary sheave shaft.

6 Claims, 6 Drawing Sheets

CENTRIFUGAL CLUTCH AND STRADDLE TYPE VEHICLE INCLUDING THE CENTRIFUGAL CLUTCH

RELATED APPLICATIONS

This application claims the benefit of priority under 35 USC 119 of Japanese patent application no. 2007-143218, filed on May 30, 2007, which application is hereby incorporated by reference in its entirety.

BACKGROUND OF THE INVENTION

1. Field of the Invention

The present invention relates to a centrifugal clutch and a straddle type vehicle including the centrifugal clutch.

2. Description of Related Art

A centrifugal clutch in which outer plates and inner plates are press-fitted together with the use of roller weights moved by centrifugal force is conventionally used in straddle type vehicles such as motorcycles and four-wheeled buggies (for example, see JP-A-2007-38736).

This type of centrifugal clutch includes a clutch housing rotating with an input shaft and a clutch boss disposed inside the clutch housing. Outer plates are mounted on the clutch housing. Inner plates facing the outer plates are mounted on the clutch boss. Roller weights are mounted between the clutch housing and the outer plates. Cam surfaces for guiding the roller weights are formed on the clutch housing. When the roller weights receive centrifugal force and move outward in a radial direction of the input shaft, they are guided by the cam surfaces in directions such that the outer plates and the inner plates are press-fitted together.

The vehicle width of a straddle type vehicle is preferably not excessively large since a rider has difficulty in straddling the vehicle. However, when an engine with a large displacement is used, the entire engine unit becomes large since a large-sized centrifugal clutch has to be used. Therefore, there is a problem that the vehicle width becomes accordingly large.

SUMMARY OF THE INVENTION

The present invention addresses this problem and provides a centrifugal clutch with reduced size and a straddle type vehicle with reduced width that includes the centrifugal clutch.

The present invention provides a centrifugal clutch to be engaged and disengaged when a straddle type vehicle starts and stops traveling. The centrifugal clutch includes a clutch housing that rotates together with an input shaft that rotates when receiving a torque from a drive source. A clutch boss is disposed inside the clutch housing with respect to a radial direction of the input shaft. An outer plate is mounted on the clutch housing to be slidable with respect to an axial direction of the input shaft. An inner plate is mounted on the clutch boss to be slidable with respect to the axial direction of the input shaft and faces the outer plate. A roller weight is provided between the clutch housing and the outer plate. A first cam surface is formed on the clutch housing and is configured to guide the roller weight in a direction such that the outer plate and the inner plate are press-fitted together when the roller weight receives centrifugal force and moves outward in the radial direction of the input shaft. A second cam surface is formed at least at an inner end of the outer plate in the radial direction and is configured to guide the roller weight outward in the radial direction of the input shaft and toward the first cam surface with respect to the axial direction of the input shaft when the roller weight receives centrifugal force and moves.

As described above, a second cam surface is formed on the outer plate and is configured to guide the roller weight outward in the radial direction of the input shaft and toward the first cam surface with respect to the axial direction of the input shaft when the roller weight receives centrifugal force and moves. In a conventional centrifugal clutch, when the roller weight is positioned most inward in the radial direction, the roller weight projects out most toward the first cam surface. However, in the centrifugal clutch according to the invention, when the roller weight is positioned most inward in the radial direction of the input shaft, the second cam surface reduces the projection of the roller weight toward the first cam surface. Thereby, the width of the centrifugal clutch (a size in the axial direction of the input shaft) can be reduced at a part that the width becomes largest. Therefore, the size of the centrifugal clutch can be reduced, or an increase in the size of the centrifugal clutch can be limited, even if clutch capacity is increased.

A straddle type vehicle according to the invention includes the centrifugal clutch.

With the above straddle type vehicle, the size of the centrifugal clutch is reduced, and thus the vehicle width of a straddle type vehicle is reduced. Therefore, an increase in vehicle width is reduced by reducing an increase in a size of the centrifugal clutch, even if clutch capacity is increased.

As described in the foregoing, with the present invention, the size of the centrifugal clutch is reduced, and the vehicle width of a straddle type vehicle including the centrifugal clutch is reduced.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
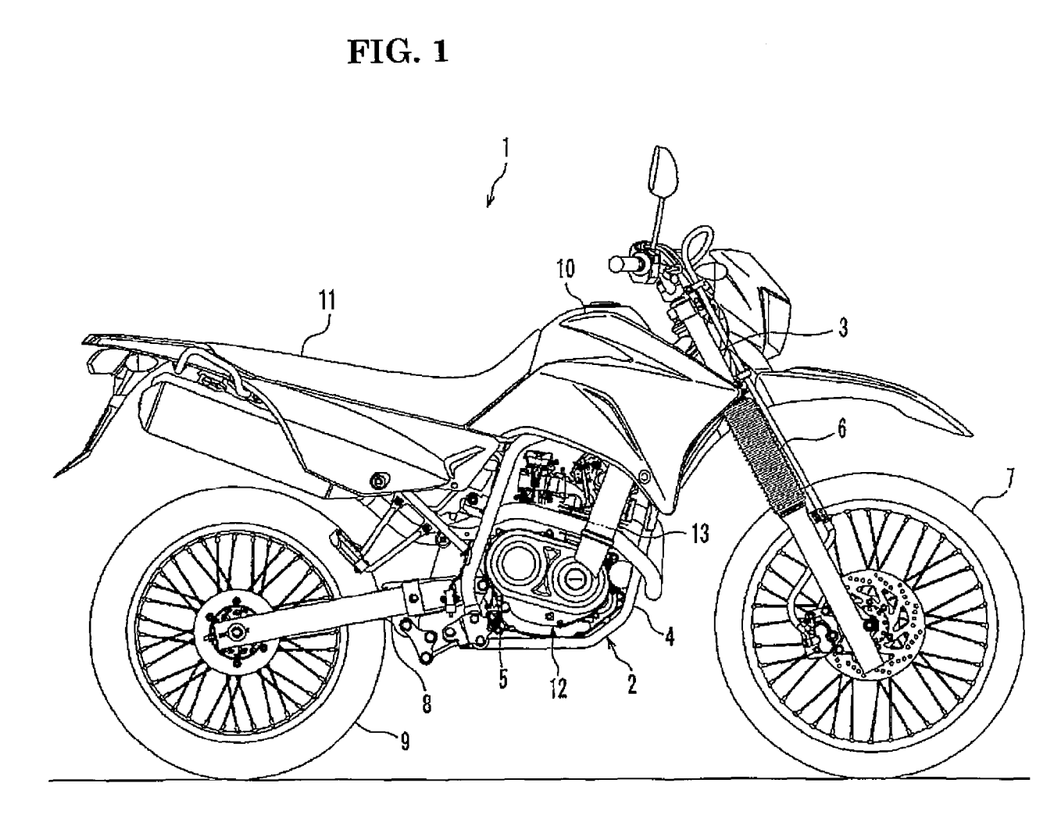
FIG. 1 is a side view of a straddle type vehicle according to an embodiment of the invention.

A motorcycle 1 according to an embodiment of the invention is described in detail hereinafter. The off-road type motorcycle 1 shown in FIG. 1 is an example of a straddle type vehicle embodying the present invention. However, the present invention is not limited to an off-road type motorcycle, but may be, for example, motorcycles other than off-road type (motorcycles of on-road type, scooter type, so-called moped type, and so forth). Further, the vehicle may be a straddle type vehicle other than a motorcycle (for example, an ATV: All Terrain Vehicle).

—General Construction of Motorcycle 1—

The general construction of motorcycle 1 is described with reference to FIG. 1. In the following description, the foreand-aft, and right-and-left directions are the directions as seen from a rider seated on a seat 11.

Motorcycle 1 includes a vehicle body frame 2. Vehicle body frame 2 includes a head pipe 3, a down tube 4 extending downward from head pipe 3, and a seat pillar 5 extending rearward from head pipe 3. A lower end of head pipe 3 is connected to a front wheel 7 via a front fork 6. A rear arm 8 extending rearward is pivotally supported in a vicinity of a lower end of seat pillar 5. A rear end of rear arm 8 is connected to a rear wheel 9. A cover 10 covers vehicle body frame 2. Seat 11 is provided slightly behind a center of the cover 10.

Figure 2:
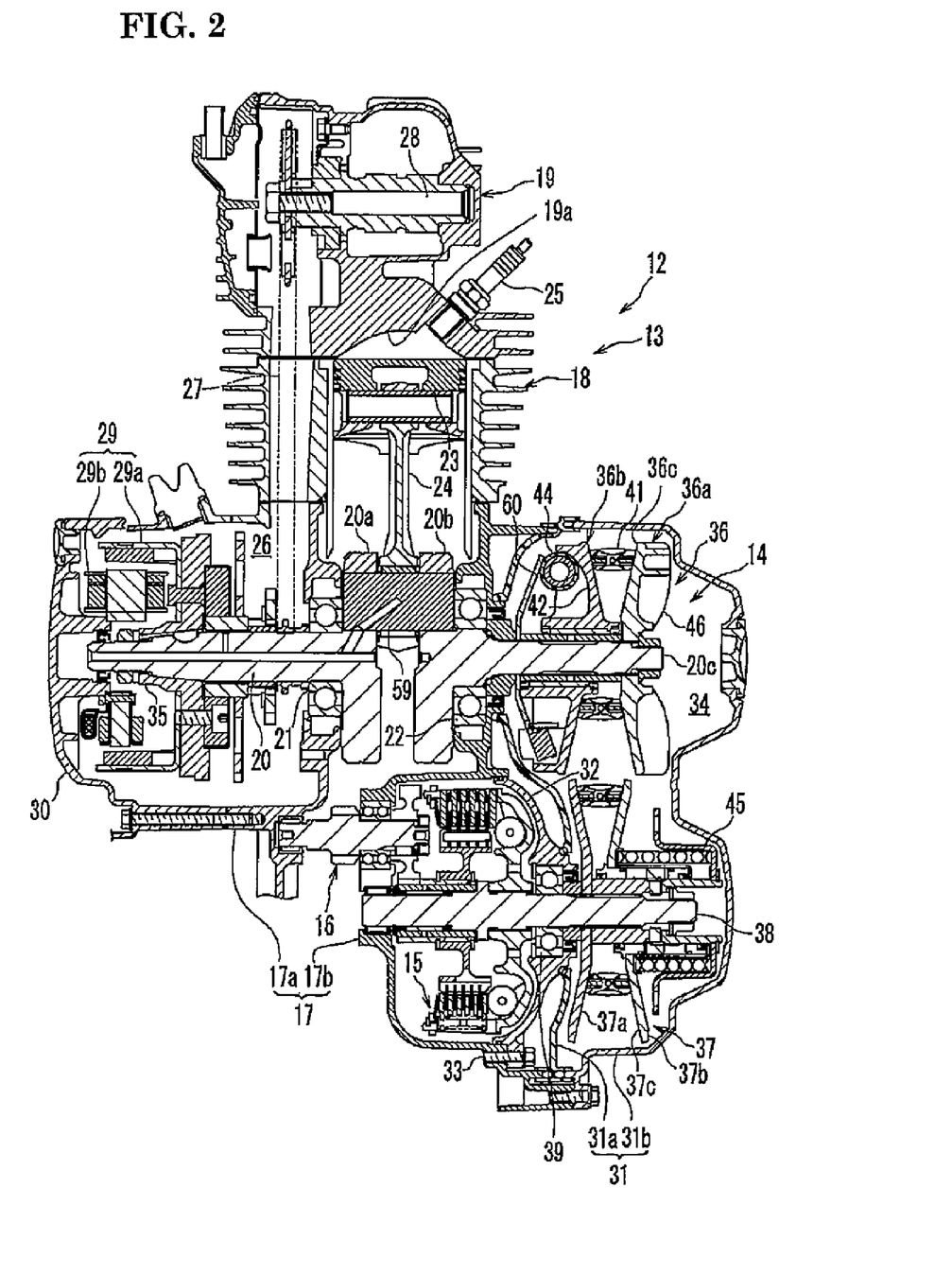
FIG. 2 is a cross-sectional view of a part of the straddle type vehicle according to the embodiment of the invention.

An engine unit 12 is supported by and disposed between down tube 4 and seat pillar 5. As shown in FIG. 2, an engine 13, a belt type continuously variable transmission (CVT) 14, a centrifugal clutch 15, a deceleration mechanism 16 and so forth are assembled into engine unit 12. Driving force generated in engine unit 12 is transmitted to rear wheel 9 via power transmitting means such as a chain belt. Here, engine 13 is described as a four-cycle single cylinder engine. However, engine 13 may be a two-cycle engine or a multi-cylinder engine.

-Construction of Engine Unit 12-

The construction of engine unit 12 is described with reference to FIG. 2. Engine unit 12 includes engine 13, CVT 14, centrifugal clutch 15 and deceleration mechanism 16. For convenience of description, the construction of deceleration mechanism 16 is partially omitted in FIG. 2.

Engine 13 includes a crankcase 17, a generally cylindrically shaped cylinder 18 and a cylinder head 19. Crankcase 17 comprises a first case block 17a positioned on the left and a second case block 17b positioned on the right. First case block 17a and second case block 17b face each other in the vehicle width direction. Cylinder 18 is connected to a part in front of and obliquely above crankcase 17 (see also FIG. 1). A cylinder head 19 is connected to a top end of cylinder 18.

A crankshaft 20 horizontally extending in the vehicle width direction is housed in crankcase 17. Crankshaft 20 is supported by first case block 17a and second case block 17b via bearings 21 and 22.

A piston 23 is slidably inserted into cylinder 18. One end of a connecting rod 24 is connected to a part of piston 23 close to crankshaft 20. The other end of connecting rod 24 is coupled with a crank pin 59 disposed between a left crank arm 20a and a right crank arm 20b of crankshaft 20. Thereby, piston 23 reciprocally moves in cylinder 18 together with rotation of crankshaft 20.

A concaved part 19a connected to an inner space of cylinder 18, and an intake port and exhaust port communicatively connected to concaved part 19a, are formed in cylinder head 19. An ignition plug 25 is inserted and fixed into cylinder head 19 in a manner such that an ignition part at a tip thereof is exposed in concaved part 19a.

A cam chain chamber 26 for connecting an inner part of crankcase 17 and an inner part of cylinder head 19 is formed on a left part in cylinder 18. A timing chain 27 is disposed inside cam chain chamber 26 and is wound around crankshaft 20 and a camshaft 28. Thereby, camshaft 28 rotates together with rotation of crankshaft 20, and an intake valve and an exhaust valve are opened and closed.

A generator casing 30 for housing a generator 29 is removably mounted on a left side of a front half part of first case block 17a. A transmission casing 31 for housing CVT 14 is mounted on a right side of second case block 17b. An opening formed in a right side of a rear half part of second case block 17b is blocked by a clutch cover 32. Clutch cover 32 is removably fixed to second case block 17b by a bolt 33.

Transmission casing 31 is formed independently of crankcase 17. Transmission casing 31 comprises an inner casing 31a for covering a part of CVT 14 positioned inside (left side) in the vehicle width direction and an outer casing 31b for covering a part of CVT 14 positioned outside (right side) in the vehicle width direction. Inner casing 31a is mounted on the right of crankcase 17, and outer casing 31b is mounted on the right of inner casing 31a. A belt chamber 34 is defined by outer casing 31b and inner casing 31a.

A left end of crankshaft 20 passes through first case block 17a and reaches an inside of generator casing 30. Generator 29 is mounted at a left end of crankshaft 20 and includes a stator 29b facing a rotor 29a. Rotor 29a is fixed to a sleeve 35, which rotates together with crankshaft 20, so as not to be rotatable relative to sleeve 35. Meanwhile, stator 29b is fixed to generator casing 30 so as not to be rotatable or displaceable relative to generator casing 30. Thereby, rotor 29a rotates relative to stator 29b together with rotation of crankshaft 20, and electric power is generated.

CVT 14 is housed in belt chamber 34. CVT 14 includes a secondary sheave 37 disposed in the rear of a primary sheave 36. Crankshaft 20 passes through second case block 17b and inner casing 31a and extends to belt chamber 34. A right part of crankshaft 20 (a part on the right of bearing 22) forms a primary sheave shaft 20c. Primary sheave 36 is supported by primary sheave shaft 20c. Thereby, primary sheave 36 rotates together with rotation of crankshaft 20.

A secondary sheave shaft 38 passing through inner casing 31a and clutch cover 32 and extending into crankcase 17 is disposed in a rear half part of transmission casing 31. Secondary sheave shaft 38 is mounted on clutch cover 32 via a bearing 39. Secondary sheave shaft 38 is mounted on second case block 17b via a bearing 40. Secondary sheave 37 is supported by secondary sheave shaft 38 in belt chamber 34.

A V-belt (for example, a resin block V-belt) 41 is wound around secondary sheave 37 and primary sheave 36. Therefore, when primary sheave 36 rotates together with crankshaft 20, a torque of the rotation is transmitted to secondary sheave 37 via V-belt 41, and secondary sheave shaft 38 thereby rotates together with secondary sheave 37. Rotation of secondary sheave shaft 38 is transmitted to rear wheel 9 (see FIG. 1) via centrifugal clutch 15, deceleration mechanism 16 and a power transmitting means such as a belt or a chain.

The construction of CVT 14 is now more specifically described. Primary sheave 36 includes a fixed sheave half 36a and a movable sheave half 36b that are taper-shaped. Fixed sheave half 36a is fixed to a right end of primary sheave shaft 20c in a manner such that it approaches to the outer side in the vehicle width direction (to the right side) toward its outer side in the radial direction. Fixed sheave half 36a rotates together with primary sheave shaft 20c. Movable sheave half 36b is disposed in a part closer to a center than (on the left side of) fixed sheave 36a in a manner such that it approaches to the inner side in the vehicle width direction (to the left side) toward its outer side in the radial direction. Movable sheave half 36b is mounted on primary sheave shaft 20c so as to be slidable in the axial direction but not rotatable relative to primary sheave shaft 20c.

A belt groove 36c having a cross section in generally a V-shape is formed by fixed sheave half 36a and movable sheave half 36b. A V-belt 41 is wound around belt groove 36c. Movable sheave half 36b displaces relative to fixed sheave half 36a, and thereby the width of belt groove 36c is variable.

A fan 46 for cooling is provided on an outer surface (the right side surface in FIG. 2) of fixed sheave half 36a. A plurality of cam surfaces 42 extending in the radial direction are formed on a left side surface of movable sheave half 36b.

A cam plate 60 faces cam surfaces 42 on the left of movable sheave half 36b. A plurality of generally cylindrically shaped (or generally column-shaped) roller weights 44 that are not displaceable in the rotational direction but are displaceable in the radial direction are disposed in a space defined between cam plate 60 and cam surfaces 42. Cam surfaces 42 are formed in a tapered shape such that they approach cam plate 60 from their center toward their outer side in the radial direction. Cam plate 60 is also formed in a tapered shape such that it approaches cam surfaces 42 from its center toward its outer side in the radial direction. That is, widths between cam plate 60 and cam surfaces 42 become narrower toward the outer side in the radial direction.

Secondary sheave 37 includes a fixed sheave half 37a and a movable sheave half 37b positioned further outward than fixed sheave half 37a in the vehicle width direction and facing fixed sheave half 37a. Fixed sheave half 37a is fixed to secondary sheave shaft 38 such that it approaches to the inner side in the vehicle width direction (to the left side) toward its outer side in the radial direction, and rotates together with secondary sheave shaft 38. Movable sheave half 37b is fixed to secondary sheave shaft 38 such that it approaches to the outer side in the vehicle width direction (to the right side) toward its outer side in the radial direction. Movable sheave half 37b is mounted on secondary sheave shaft 38 so as to be slidable in the axial direction but not rotatable relative to secondary sheave shaft 38.

Fixed sheave half 37a and movable sheave half 37b form a belt groove 37c having a cross section in generally a V-shape and around which V-belt 41 is wound. Movable sheave half 37b displaces relative to fixed sheave half 37a, and the width of belt groove 37c is thereby variable. An axial part of movable sheave half 37b is formed into a cylindrical slide collar, and spline-fitted to secondary sheave shaft 38.

A compression coil spring 45 is disposed outside of movable sheave half 37b in the vehicle width direction (on the right side). Movable sheave half 37b is urged toward fixed sheave half 37a by compression coil spring 45. The width of belt groove 37c thereby becomes smallest in a state that an engine speed is low, for example, in an idling state.

In CVT 14, a transmission ratio is determined depending on a ratio between a force by which roller weights 44 press movable sheave half 36b toward fixed sheave half 36a (toward the right side) and a force by which compression coil spring 45 urges movable sheave half 37b toward fixed sheave half 37a (toward the left side).

More specifically, when a rotational speed of primary sheave shaft 20c is low, the width of belt groove 37c of secondary sheave 37 is narrowed due to an urging force of compression coil spring 45 (see the state of secondary sheave 37 drawn in the part above secondary sheave shaft 38 in FIG. 2 (maximum transmission ratio position)). Therefore, a radius of the belt wound around secondary sheave 37 increases, and V-belt 41 is drawn toward secondary sheave 37. Movable sheave half 36b is thereby pressed toward cam plate 60 by V-belt 41, and the width of belt groove 36c of primary sheave 36 is increased (see the state of primary sheave 36 drawn in the part below primary sheave shaft 20c in FIG. 2 (maximum transmission ratio position)). As a result, the transmission ratio increases.

On the other hand, when a rotational speed of primary sheave shaft 20c increases, roller weights 44 receive centrifugal force and move outward in the radial direction. Since the distance between movable sheave half 36b and cam plate 60 decreases toward the outer side in the radial direction, movable sheave half 36b is pressed toward fixed sheave half 36a (to the right side) as roller weights 44 move outward in the radial direction. Then, movable sheave half 36b slides toward fixed sheave half 36a, and belt groove 36c is narrowed (see the state of primary sheave 36 drawn in the part above primary sheave shaft 20c in FIG. 2). The radius of the belt wound around primary sheave 36 thereby increases. Accompanying this, V-belt 41 is drawn toward primary sheave 36 and presses movable sheave half 37b in a direction away from fixed sheave half 37a (to the right side) against the urging force of compression coil spring 45. Movable sheave half 37b thereby slides in the direction away from fixed sheave half 37a, and the radius of the belt around secondary sheave 37 decreases (see the state of secondary sheave 37 drawn in the part below secondary sheave shaft 38 in FIG. 2). As a result, the transmission ratio decreases.

Roller weights 44 move inward and outward in the radial direction, and the distances between cam surfaces 42 and cam plate 60 are thereby changed. Therefore, roller weights 44 may be replaced by any component that can move inward and outward in the radial direction. For example, the component may have a spherical shape, a short cylindrical shape, and so forth. The component may move by rotation or by sliding.

Figure 3:
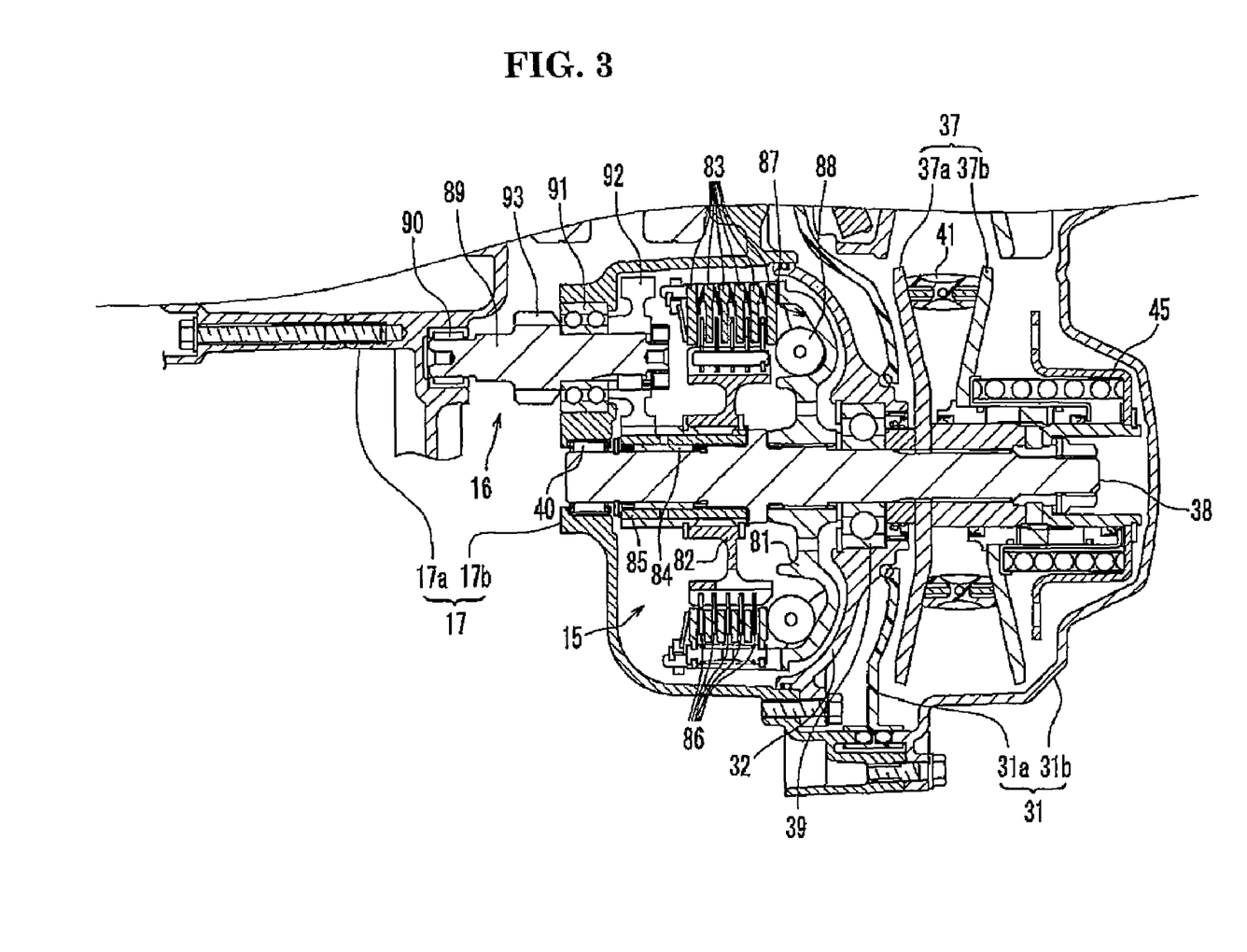
FIG. 3 is a partial enlarged view of FIG. 2.

FIG. 3 is an enlarged view showing a vicinity of centrifugal clutch 15 and deceleration mechanism 16 in FIG. 2. As shown in FIG. 3, centrifugal clutch 15 is mounted on a left part of secondary sheave shaft 38. Centrifugal clutch 15 is a wet type multiple disc clutch, and includes a generally cylindrically shaped clutch housing 81 and a clutch boss 82. Clutch housing 81 is spline-fitted to secondary sheave shaft 38, and rotates together with secondary sheave shaft 38. A plurality of ring-shaped outer plates 83 are mounted on clutch housing 81. Outer plates 83 are disposed at intervals so as to be slidable in the axial direction of secondary sheave shaft 38.

A cylindrically shaped gear 85 is rotatably fitted around the left part of secondary sheave shaft 38 via a bearing 84. Clutch boss 82 is disposed inside outer plates 83 in the radial direction and outside gear 85 in the radial direction, and engages with gear 85. Gear 85 thereby rotates together with clutch boss 82. A plurality of ring-shaped inner plates 86 are mounted outside clutch boss 82 in the radial direction and are disposed at intervals so as to be slidable in the axial direction of secondary sheave shaft 38. Each inner plate 86 is disposed between adjacent outer plates 83, 83. Inner plates 86 face respective outer plates 83.

A plurality of cam surfaces 87 are formed on the left of clutch housing 81. A plurality of generally cylindrically shaped (or generally column-shaped) roller weights 88 are disposed in a space defined between cam surfaces 87 and the rightmost outer plate 83 facing cam surfaces 87. Roller weights 88 are displaceable in the radial direction but not displaceable in the rotational direction.

Figure 4:
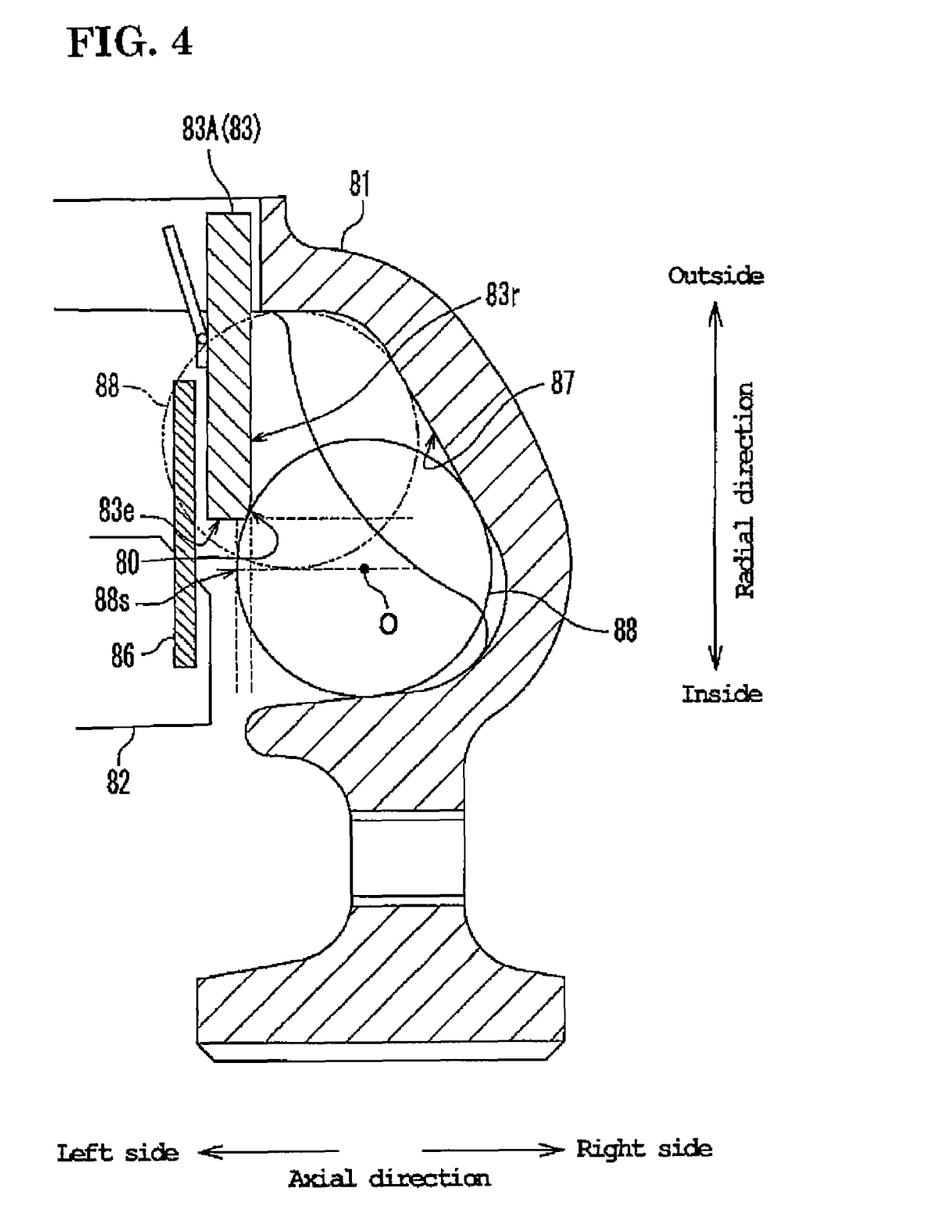
FIG. 4 is an enlarged view showing a part of a centrifugal clutch.

FIG. 4 is an enlarged view showing a vicinity of roller weight 88 in FIG. 3. As shown in FIG. 4, cam surfaces 87 are formed to guide roller weights 88 in a direction such that outer plates 83 and inner plates 86 are press-fitted together when roller weights 88 receive centrifugal force and move outward in the radial direction. Specifically, in this embodiment, cam surfaces 87 are formed to approach the rightmost outer plate 83 (referred to as "outer plate 83A" with reference to FIG. 4) toward the outer side in the radial direction.

In this embodiment, cam surfaces 87 are slightly longer than conventional cam surfaces. Specifically, as shown in FIG. 4, cam surfaces 87 are formed in a manner such that centers O of roller weights 88 are positioned more inward in the radial direction than inner ends 83e of outer plates 83 when roller weights 88 are positioned most inward with respect to the radial direction. Therefore, when roller weights 88 are positioned most inward with respect to the radial direction, left ends 88s of roller weights 88 are positioned more left than a right end (right side surface) 83r of outer plate 83A with respect to the axial direction of secondary sheave shaft 38.

Meanwhile, a cam surface 80 is formed on rightmost outer plate 83A. Cam surface 80 is formed at an inner end in the radial direction of right end (right side surface) 83r of outer plate 83A. Cam surface 80 is formed to approach cam surfaces 87 with respect to the axial direction of secondary sheave shaft 38 toward the outer side in the radial direction. Thereby, when roller weights 88 receive centrifugal force and move, cam surface 80 guides roller weights 88 outward in the radial direction and toward cam surfaces 87 with respect to the axial direction of secondary sheave shaft 38.

Figure 5:
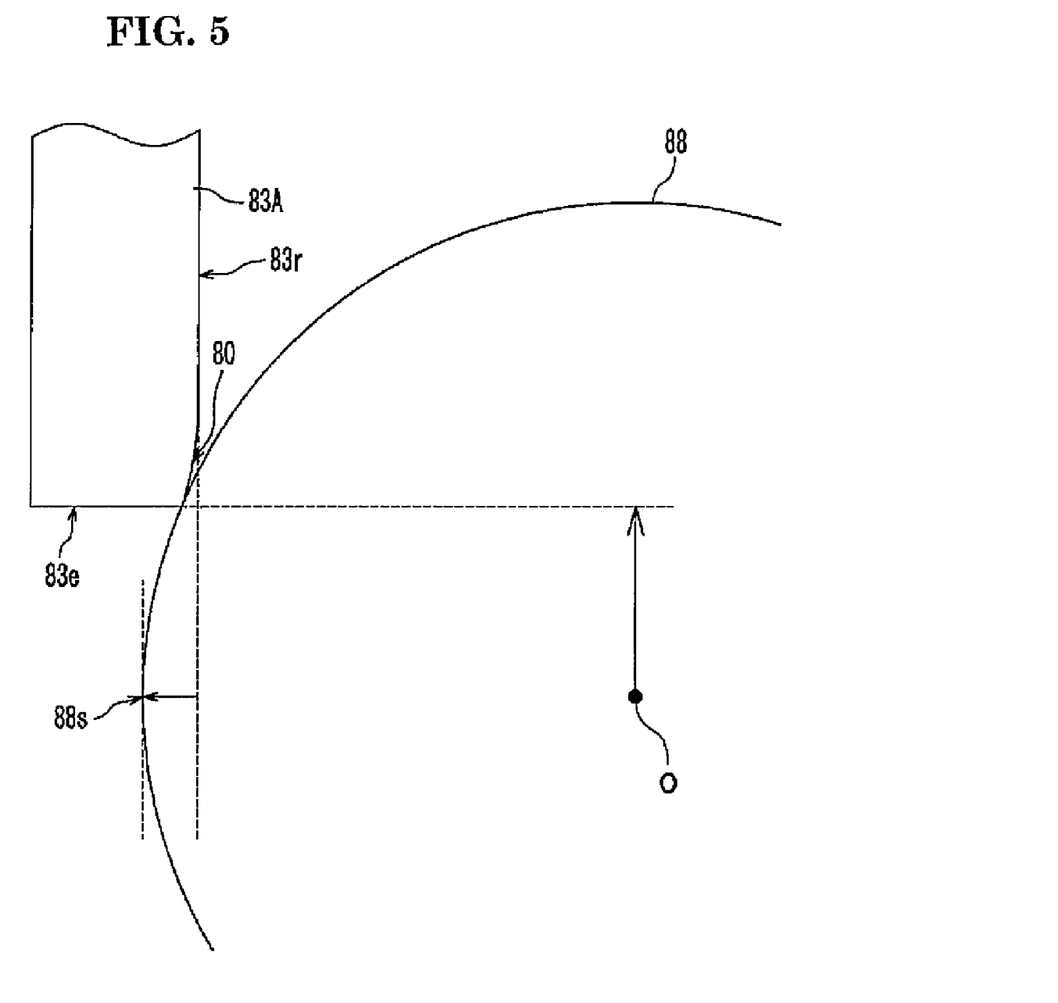
FIG. 5 is an enlarged view showing a cam surface.

Outer plate 83A is formed into a shape such that a corner of a plate body of which a cross section taken in the radial direction of secondary sheave shaft 38 is generally rectangular is chamfered. The chamfered part is cam surface 80. As shown in FIG. 5 as enlarged, in this embodiment, cam surface 80 is formed with a convex curved surface.

With such a construction, roller weights 88 receive centrifugal force and move inward or outward with respect to the radial direction of secondary sheave shaft 38, and the distance between cam surfaces 87 and outer plate 83A thereby changes. Roller weights 88 may be replaced by any component that can move inward and outward with respect to the radial direction of secondary sheave shaft 38. For example, the component may have a spherical shape, a short cylindrical shape, and so forth. Further, the component may move by rotation or by sliding.

As shown in FIG. 3, deceleration mechanism 16 is interposed between centrifugal clutch 15 and an output shaft (not shown). Deceleration mechanism 16 has a speed change shaft 89 disposed in parallel with secondary sheave shaft 38. Speed change shaft 89 is rotatably supported by first case block 17a via a bearing 90. Speed change shaft 89 is rotatably supported by second case block 17b via a bearing 91. A first speed change gear 92 engaging with gear 85 is provided at a right end of speed change shaft 89.

A second speed change gear 93 with a diameter smaller than that of first speed change gear 92 is provided in a center part of speed change shaft 89. Second speed change gear 93 engages with the output shaft or a gear provided on the output shaft.

In such a construction, clutch boss 82 and the output shaft are coupled together via gear 85, first speed change gear 92, speed change shaft 89, second speed change gear 93 and so forth. Therefore, the output shaft rotates along with rotation of clutch boss 82. A power transmitting mechanism for transmitting driving force of the output shaft to rear wheel 9 (see FIG. 1), such as a chain, is wound around the output shaft. The drive converting mechanism may be a member other than a chain such as a transmission belt, a gear mechanism assembled from a plurality of gears, and a drive shaft.

Engine unit 12 has now been described. Next, operation of centrifugal clutch 15 is described.

—Operation of Centrifugal Clutch 15—

In centrifugal clutch 15, a clutch-in state (engaged state) and a clutch-off state (disengaged state) are automatically switched according to a magnitude of centrifugal force applied to roller weights 88. In FIG. 3, the part below secondary sheave shaft 38 shows the clutch-in state, and the part above it shows the clutch-out state. In FIG. 4, roller weight 88 in the clutch-in state is expressed with a chain double-dashed line, and roller weight 88 in the clutch-out state is expressed with a solid line.

The operation by which the clutch-out state is switched into the clutch-in state is first described. When the rotational speed of clutch housing 81 is less than a prescribed speed, roller weights 88 are held between outer plate 83A and clutch housing 81, and positioned most inward with respect to the radial direction of secondary sheave shaft 38. At this point, outer plates 83 and inner plates 86 do not receive pressing force from roller weights 88, and are not press-fitted together. Therefore, centrifugal clutch 15 remains in the clutch-off state. However, if the rotational speed of clutch housing 81 increases to a prescribed speed or more, roller weights 88 receive centrifugal force and start moving outward in the radial direction.

Roller weights 88 then move along cam surfaces 87 formed on clutch housing 81. Specifically, cam surfaces 87 guide roller weights 88 toward the left (toward cam surface 80) with respect to the axial direction of secondary sheave shaft 38 as roller weights 88 move outward in the radial direction. Outer plate 83A is thereby pressed toward the left by roller weights 88. As a result, outer plates 83 and inner plates 86 are press-fitted together, and centrifugal clutch 15 moves to the clutch-in state that a torque of secondary sheave shaft 38 is transmitted to the output shaft (not shown) via centrifugal clutch 15.

As described above, cam surfaces 87 are formed slightly longer than conventional cam surfaces. Thereby, when roller weights 88 are positioned most inward with respect to the radial direction of secondary sheave shaft 38, left ends 88s of roller weights 88 are positioned more left than right end 83r of outer plate 83A with respect to the axial direction of secondary sheave shaft 38 (see FIGS. 4 and 5). Therefore, if an outer plate 83A on which cam surface 80 is not formed and of which a cross section taken in the radial direction of secondary sheave shaft 39 is generally rectangular as in the conventional centrifugal clutch were used, roller weights 88 might be caught on a corner of outer plate 83A in moving outward in the radial direction of secondary sheave shaft 39.

However, outer plate 83A according to this embodiment has cam surface 80 formed in a manner such that the corner of outer plate 83A is chamfered. Therefore, cam surface 80 smoothly guides roller weights 88 outward in the radial direction and toward the right (toward cam surfaces 87) along the axial direction of secondary sheave shaft 38.

The operation by which the clutch-in state is switched into the clutch-out state is described next. When the rotational speed of clutch housing 81 decreases and becomes less than a prescribed speed, centrifugal force acting on roller weights 88 decreases. Roller weights 88 thereby move inward in the radial direction of secondary sheave shaft 38. As a result, outer plates 83 and inner plates 86, which are press-fitted together, are released from each other. Centrifugal clutch 15 thereby moves to the clutch-off state in which a torque of secondary sheave shaft 38 is not transmitted to the output shaft.

Figure 6:
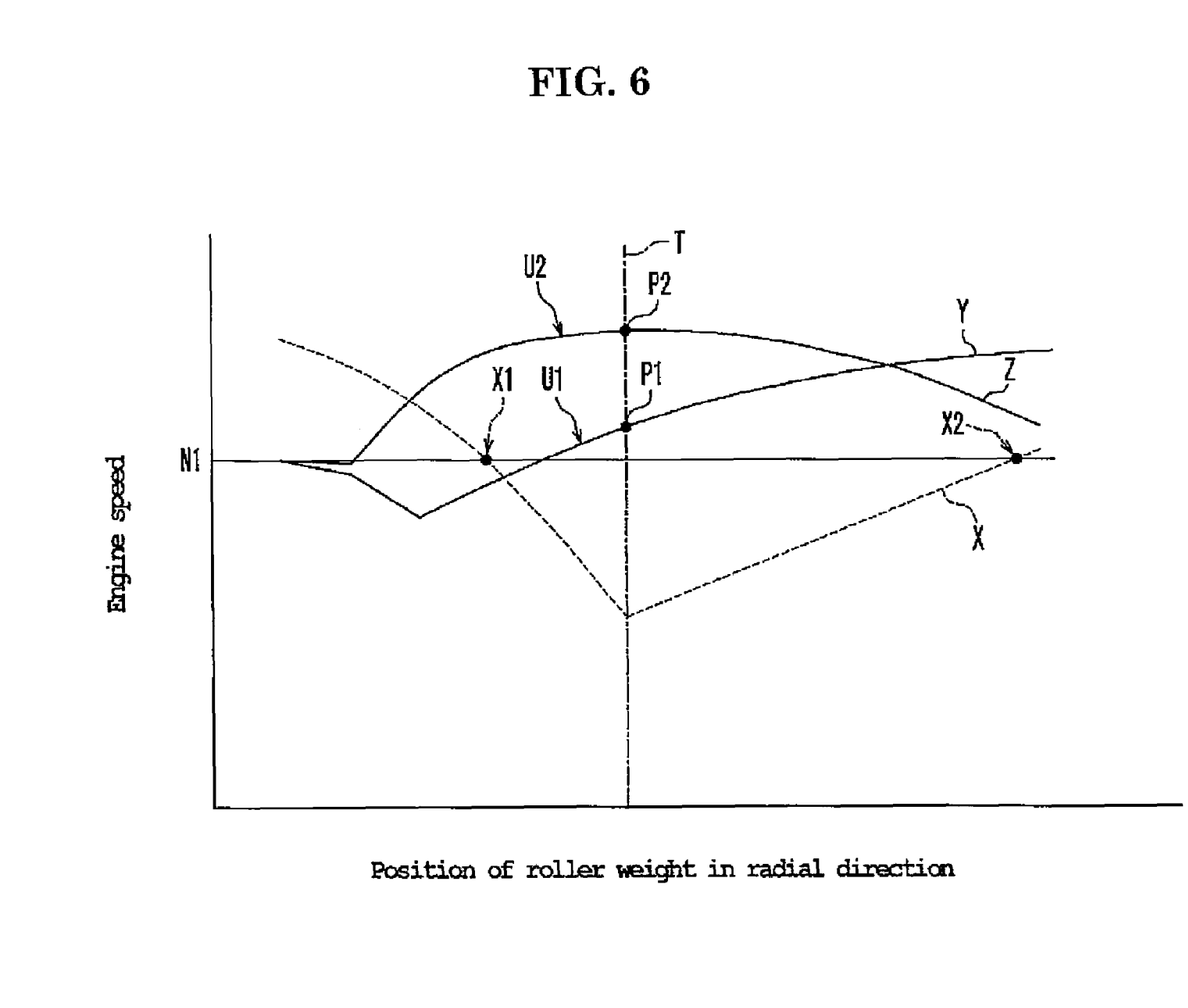
FIG. 6 shows characteristic curves indicating the relationship between the position of a roller weight in a radial direction and the engine speed.

The operation of centrifugal clutch 15 has now been described. Characteristic curves indicated in a correlation graph as shown in FIG. 6, in which the horizontal axis represents the position of roller weight 88 and the vertical axis represents the engine speed, are now described. Here, the position of roller weight 88 means the position of the center O of roller weight 88 with respect to the radial direction of secondary sheave shaft 38 given that the axis of secondary sheave shaft 38 is zero.

—Characteristic Curves—

Characteristic curve X indicates a case that cam surface 80 is not provided on outer plate 83A. Characteristic curves Y and Z each indicate a case that cam surface 80 is provided.

Straight line T extending in parallel with the vertical axis in FIG. 6 indicates a state that the centers O of roller weights 88 are in the position of inner ends 83e of outer plates 83 in the radial direction (the position of inner end 83e of outer plate 83 with respect to the radial direction of secondary sheave shaft 38 given that the axis of secondary sheave shaft 38 is zero).

In a conventional centrifugal clutch, cam surfaces 87 are formed on clutch housing 81 in a manner such that positions of centers O of roller weights 88 are generally equal to positions of inner ends 83e of outer plates 83 in the radial direction with respect to the radial direction of secondary sheave shaft 38 when roller weights 88 are positioned most inward with respect to the radial direction of secondary sheave shaft 38. Therefore, characteristic curves conventionally exist only in the right side area of straight line T, and the curves stably move upward toward the right.

However, in the centrifugal clutch in which cam surfaces 87 are formed longer than the conventional cam surfaces as in centrifugal clutch 15 according to this embodiment of the invention, centers O of roller weights 88 are positioned more inward in the radial direction than inner ends 83e of outer plates 83 when roller weights 88 are positioned most inward with respect to the radial direction of secondary sheave shaft 38. Thereby, characteristic curves exist also in the left side area of straight line T in the centrifugal clutch in which cam surfaces 87 are formed longer as in centrifugal clutch 15 (see characteristic curves X, Y, and Z).

There is a fall on characteristic curve X at its intersection with straight line T. This means that movements of roller weights 88 become unstable. Specifically, although the engine speed rises, roller weights 88 are caught on the corner of outer plate 83A, and do not smoothly start moving. When the engine speed further increases, roller weights 88 climb over the corner of outer plate 83A, and rapidly move outward in the radial direction. For example, roller weights 88 rapidly move from point X1 on characteristic curve X to point X2 on characteristic curve X at which the engine speed is equal to engine speed N1 at point X1. Due to this, roller weights 88 do not gradually press-fit outer plates 83 and inner plates 86 together according to increase in the engine speed, but rapidly press-fit them together. Therefore, a centrifugal clutch having characteristics indicated by characteristic curve X provides a clutch feeling that is not preferable.

Differently from characteristic curve X, there are no large falls at intersections of characteristic curves Y and Z with straight line T. Characteristic curves Y and Z have parts U1 and U2 moving upward toward the right that intersect with straight line T. In other words, characteristic curves Y and Z have respective parts U1 and U2 moving upward toward the right that extend across points P1 and P2 at which positions of centers O of roller weights 88 are equal to a position of inner end 83e of outer plate 83A. Movements of roller weights 88 are thereby stabilized. Specifically, in centrifugal clutch 15 having such characteristics, roller weights 88 gradually move outward in the radial direction along with a rise in the engine speed. Roller weights 88 thereby smoothly move in parts (around P1 or P2) that positions of centers O in the radial direction are generally equal to positions of inner ends 83e of outer plates 83 in the radial direction. Outer plates 83 and inner plates 86 are thereby gradually press-fitted together. Centrifugal clutch 15 according to this embodiment, having characteristics indicated by characteristic curves Y and Z, therefore provides a preferable clutch feeling as compared to a centrifugal clutch having characteristics indicated by characteristic curve X.

As has been described, outer plate 83A of centrifugal clutch 15 according to this embodiment has cam surface 80 formed to guide roller weights 88 outward in the radial direction and toward cam surfaces 87 with respect to the axial direction of secondary sheave shaft 38 when roller weights 88 receive centrifugal force and move. In a conventional centrifugal clutch, roller weights 88 project out most toward cam surfaces 87 when roller weights 88 are positioned most inward in the radial direction of secondary sheave shaft 38. However, in centrifugal clutch 15, cam surface 80 reduces the projection of roller weights 88 toward cam surfaces 87 when roller weights 88 are positioned most inward with respect to the radial direction of secondary sheave shaft 38. The width of centrifugal clutch 15 (its size with respect to the axial direction of secondary sheave shaft 38) is thereby reduced at the part that its width is largest. Therefore, a size of centrifugal clutch 15 is reduced. With centrifugal clutch 15, the size of centrifugal clutch 15 can be reduced, or increase in a size of centrifugal clutch 15 can be prevented, even if a clutch capacity is increased.

In increasing the clutch capacity, the numbers of outer plates 83 and inner plates 86 may be increased. In such a case, the stroke amounts of roller weights 88 with respect to the axial direction of secondary sheave shaft 38 must be increased. Therefore, clutch housing 81 may be made larger to ensure the stroke amounts. However, if clutch housing 81 is made larger, centrifugal clutch 15 becomes larger, resulting in increased vehicle width of motorcycle 1. Thus, it is not preferable.

Therefore, the present inventors modified a shape of clutch housing 81 and elongated cam surfaces 87 inward in the radial direction without increasing the size of clutch housing 81. Thereby, when roller weights 88 are positioned most inward with respect to the radial direction of secondary sheave shaft 38, centers O of roller weights 88 are positioned more inward in the radial direction than inner ends 83e of outer plates 83. As described above, even in the case where the numbers of outer plates 83 and inner plates 86 are increased to increase the clutch capacity, cam surface 80 is formed on outer plate 83A, and the size of centrifugal clutch 15 is thereby reduced.

However, in a centrifugal clutch in which centers O of roller weights 88 are positioned more inward in the radial direction than inner ends 83e of outer plates 83 when roller weights 88 are positioned most inward in the radial direction as described above, roller weights 88 may be caught on the corner of outer plate 83A when roller weights 88 move outward in the radial direction of secondary sheave shaft 38. Therefore, roller weights 88 may not gradually move according to magnitude of centrifugal force, but may suddenly climb over the corner of outer plate 83A and rapidly move when roller weights 88 have obtained a certain amount of centrifugal force. As a result, the clutch feeling may be deteriorated.

However, cam surface 80 is formed on outer plate 83A of centrifugal clutch 15. Therefore, cam surface 80 prevents a situation that roller weights 88 are caught on outer plate 83A and their movements are interrupted. Thereby, roller weights 88 can smoothly move. Accordingly, centrifugal clutch 15 prevents a deterioration in clutch feeling even if cam surface 87 is elongated inward in the radial direction.

If cam surfaces 87 are elongated as described above, the left ends of roller weights 88 are positioned more left than the right end of outer plate 83A when roller weights 88 are positioned most inward in the radial direction. Therefore, the width of centrifugal clutch 15 can be reduced at the part that its width is largest since roller weights 88 project out farthest. Thereby, even if the clutch capacity of centrifugal clutch 15 is increased, an increase in a size of centrifugal clutch 15 can be reduced, or the overall width of centrifugal clutch 15 can be reduced.

Cam surface 80 of centrifugal clutch 15 is formed into a shape such that the corner of outer plate 83A of which a cross section taken in the radial direction of secondary sheave shaft 38 is generally rectangular is chamfered. Cam surface 80 can thereby be formed into a preferable shape with a simple process, and a reduced size of centrifugal clutch 15 can be realized with a simple construction.

Further, cam surface 80 of centrifugal clutch 15 is formed with a convex curved surface. Roller weights 88 can thereby be smoothly guided outward in the radial direction of secondary sheave shaft 38. Deterioration in clutch feeling is therefore more certainly prevented with centrifugal clutch 15.

Centrifugal clutch 15 has characteristics as indicated by characteristic curves Y and Z that indicate positional changes of roller weights 88 in the radial direction according to change in the engine speed. Characteristic curves Y and Z have respective parts U1 and U2 moving upward toward the right. Parts U1 and U2 moving upward toward the right intersect with straight line T which indicates that positions of roller weights 88 in the radial direction are equal to positions of inner ends 83e of outer plates 83 in the radial direction. In other words, characteristic curves Y and Z have respective parts U1 and U2 moving upward toward the right that extend across points P1 and P2 at which positions of centers O of roller weights 88 are equal to a position of inner end 83e of outer plate 83A.

With such characteristics, the movements of roller weights 88 are stabilized differently from characteristic curve X having a large fall at its intersection with straight line T. Roller weights 88 are therefore prevented from rapidly moving outward in the radial direction of secondary sheave shaft 38. The clutch feeling is thereby improved compared to a centrifugal clutch having characteristics of characteristic curve X.

Motorcycle 1 according to this embodiment of the invention includes centrifugal clutch 15. This can reduce a size of centrifugal clutch 15, and further a size of engine unit 12 and the vehicle width of the straddle type vehicle.

In centrifugal clutch 15 according to this embodiment, cam surfaces 87 formed on clutch housing 81 are elongated so that centers O of roller weights 88 are positioned more inward in the radial direction than inner end 83e of outer plate 83A when roller weights 88 are positioned most inward with respect to the radial direction of secondary sheave shaft 38. However, a centrifugal clutch according to the present invention is not limited to this. Cam surfaces 87 may be formed in a manner such that the centers of roller weights 88 are not positioned more inward than the inner end of outer plate 83A when roller weights 88 are positioned most inward in the radial direction as in the conventional centrifugal clutch.

Also in such a case as described above, the size of centrifugal clutch 15 can be reduced with cam surface 80 formed on outer plate 83A.

Cam surface 80 of centrifugal clutch 15 has been described as being provided at the inner end of outer plate 83A in the radial direction. However, cam surface 80 may be formed on a wide area including the inner end of outer plate 83A in the radial direction (for example, an area of which a length in the radial direction is half a length of outer plate 83A or more). In such a case, the same effect as described above is achieved.

In centrifugal clutch 15 according to this embodiment, cam surface 80 has been described as being formed at the inner end of outer plate 83A as a means for preventing deterioration in clutch feeling due to elongation of cam surfaces 87 into lengths larger than conventional cam surfaces. However, the invention is not so limited. The means may be not provided with cam surface 80 as long as the means has the characteristics indicated by a characteristic curve having part U1 or U2 that moves upward toward the right and intersects with straight line T as characteristic curve Y or Z. A means having such characteristics can stabilize the movements of roller weights 88 and prevent deterioration in clutch feeling.

DEFINITIONS OF TERMS

Cam surfaces 87 as a first cam surface according to the present invention guide roller weights 88 in a direction such that outer plates 83 and inner plates 86 are press-fitted together when roller weights 88 receive centrifugal force and move outward in the radial direction of secondary sheave shaft 38.

Cam surface 80 as a second cam surface according to the present invention guides roller weights 88 toward cam surfaces 87 with respect to the axial direction of secondary sheave shaft 38 when roller weights 88 receive centrifugal force and move outward in the radial direction of secondary sheave shaft 38.

As described in the foregoing, the present invention is useful for a centrifugal clutch and a straddle type vehicle including the centrifugal clutch.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A centrifugal clutch to be engaged and disengaged when a straddle type vehicle starts and stops traveling, the centrifugal clutch comprising:
   a clutch housing that rotates together with an input shaft that rotates when receiving a torque from a drive source;
   a clutch boss disposed inside the clutch housing with respect to a radial direction of the input shaft;
   an outer plate mounted on the clutch housing so as to be slidable with respect to an axial direction of the input shaft;
   an inner plate mounted on the clutch boss so as to be slidable with respect to the axial direction of the input shaft and facing the outer plate; and
   a roller weight provided between the clutch housing and the outer plate; wherein
   a first cam surface is provided on the clutch housing and is configured to guide the roller weight in a direction such that the outer plate and the inner plate are pressed together when the roller weight receives a centrifugal force and moves outwardly with respect to the radial direction of the input shaft;
   a second cam surface is provided at an innermost end of the outer plate with respect to the radial direction of the input shaft to guide the roller weight outwardly with respect to the radial direction of the input shaft and toward the first cam surface in the axial direction of the input shaft when the roller weight receives the centrifugal force and moves; and
   the first cam surface is configured such that a portion of the roller weight is positioned directly between the innermost end of the outer plate and the input shaft with respect to the radial direction of the input shaft when the roller weight is positioned at a maximum inward location with respect to the radial direction of the input shaft such that the portion of the roller weight and the outer plate overlap in the radial direction of the input shaft.

2. The centrifugal clutch according to claim 1, wherein the first cam surface is arranged such that a center of the roller weight is positioned further inward than the innermost end of the outer plate with respect to the radial direction of the input shaft when the roller weight is positioned at the maximum inward location with respect to the radial direction of the input shaft.

3. The centrifugal clutch according to claim 1, wherein a corner of the innermost end of the outer plate facing the roller weight is chamfered, and the second cam surface includes the chamfered corner.

4. The centrifugal clutch according to claim 1, wherein the second cam surface includes a convex curved surface.

5. A straddle type vehicle comprising:
the centrifugal clutch according to claim 1.

6. A motorcycle comprising:
the centrifugal clutch according to claim 1.

* * * * *